United States Patent
Jin et al.

(10) Patent No.: US 10,712,471 B2
(45) Date of Patent: Jul. 14, 2020

(54) METHODS AND SYSTEMS FOR SEISMIC MODELING USING MULTIPLE SEISMIC SOURCE TYPES

(71) Applicant: Landmark Graphics Corporation, Houston, TX (US)

(72) Inventors: Shengwen Jin, Sugar Land, TX (US); Fan Jiang, Sugar Land, TX (US); Yiqing Ren, Sugar Land, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 452 days.

(21) Appl. No.: 14/649,192

(22) PCT Filed: Dec. 10, 2013

(86) PCT No.: PCT/US2013/074003
§ 371 (c)(1),
(2) Date: Jun. 2, 2015

(87) PCT Pub. No.: WO2014/093274
PCT Pub. Date: Jun. 19, 2014

(65) Prior Publication Data
US 2015/0346385 A1    Dec. 3, 2015

Related U.S. Application Data

(60) Provisional application No. 61/737,370, filed on Dec. 14, 2012.

(51) Int. Cl.
*G01V 99/00* (2009.01)
*G01V 11/00* (2006.01)

(52) U.S. Cl.
CPC ............ *G01V 99/005* (2013.01); *G01V 11/00* (2013.01); *G01V 2210/645* (2013.01); *G01V 2210/66* (2013.01); *G01V 2210/67* (2013.01)

(58) Field of Classification Search
CPC .. G01V 99/005; G01V 99/00; G01V 2210/67; G01V 11/00; G01V 2210/66; G01V 2210/645
(Continued)

(56) References Cited

U.S. PATENT DOCUMENTS

| 4,893,694 A | 1/1990 | Houck et al. |
| 8,014,229 B2 | 9/2011 | Meunier et al. |

(Continued)

FOREIGN PATENT DOCUMENTS

| GB | 2419196 | * 4/2006 | ............... G01V 1/28 |
| GB | 2419196 A | 4/2006 | |

(Continued)

OTHER PUBLICATIONS

European Patent Office, Supplementary European Search Report, dated Nov. 27, 2015, 6 pages, Europe.
(Continued)

*Primary Examiner* — Kamini S Shah
*Assistant Examiner* — John E Johansen

(57) ABSTRACT

Systems and methods for simulating an effect of multiple seismic sources concurrently on a geologic formation are provided. Data is read from a seismic source file that describes at least two seismic source types. The concurrent propagation of acoustic energy from the at least two seismic sources types through the geologic formation is modeled. A seismic output file is then generated.

24 Claims, 7 Drawing Sheets

(58) Field of Classification Search
USPC .................................................... 703/6, 10
See application file for complete search history.

(56) References Cited

U.S. PATENT DOCUMENTS

| | | | |
|---|---|---|---|
| 2002/0191490 A1* | 12/2002 | Meunier | G01V 1/006 367/140 |
| 2005/0024990 A1 | 2/2005 | Laake | |
| 2006/0268662 A1* | 11/2006 | Rekdal | G01V 1/3808 367/15 |
| 2008/0021658 A1 | 1/2008 | Pavel et al. | |
| 2009/0248312 A1* | 10/2009 | Hsu | G01V 1/28 702/15 |
| 2010/0094559 A1* | 4/2010 | Contreras | G01V 1/30 702/14 |
| 2010/0097888 A1* | 4/2010 | Neelamani | G01V 1/005 367/53 |
| 2010/0271904 A1 | 10/2010 | Moore et al. | |
| 2011/0255371 A1 | 10/2011 | Jing et al. | |
| 2012/0257476 A1* | 10/2012 | Muhl | G01V 1/325 367/38 |
| 2015/0046093 A1* | 2/2015 | Pires De Vasconcelos | G01V 1/307 702/16 |

FOREIGN PATENT DOCUMENTS

| | | |
|---|---|---|
| WO | WO-2008123920 A1 | 10/2008 |
| WO | WO-2009146431 A1 | 12/2009 |

OTHER PUBLICATIONS

International Search Report, dated Mar. 17, 2014, 3 pages; Korean International Searching Authority.
Written Opinion of the International Preliminary Examining Authority, dated Dec. 22, 2014, 7 pages, Korean International Searching Authority.

* cited by examiner

| # OF SEISMIC SOURCES | X-COORDINATE 404 | Y-COORDINATE 406 | ELEVATION 408 | AMPLITUDE 410 | TYPE 411 | SPECIAL COEFFICIENTS 412 |
|---|---|---|---|---|---|---|
| 1 | 3000.0 | 4500.0 | −1000 | 1 | 6 | 1,0,0,0,1,0,0,1 |
| 2 | 6000.0 | 4500.0 | −1000 | 1 | 6 | 0,0,1,0,0,0,1,0,0 |
| 3 | 9000.0 | 4500.0 | −1000 | 1 | 2 | X |

*FIG. 4*

METHODS AND SYSTEMS FOR SEISMIC MODELING USING MULTIPLE SEISMIC SOURCE TYPES

CROSS-REFERENCE TO RELATED APPLICATIONS

This application is a U.S. National Stage patent application of International Patent Application No. PCT/US2013/074003, filed on Dec. 10, 2013, which claims the benefit of U.S. Provisional Application Ser. No. 61/737,370, filed on Dec. 14, 2012, and titled "System and Methods for Seismic Modeling Using Multiple Seismic Source Types," the benefit of both of which are claimed and the disclosure of both of which are incorporated herein by reference in their entireties.

BACKGROUND

Seismic exploration has long been an important part of hydrocarbon drilling and production processes. Various seismic sources may be used in the field, such as dynamite, "thumper" trucks, air guns, and other noise sources. Acquisition of seismic signals may be performed using geophones, hydrophones, and the like. By processing the acquired seismic signals, greater understanding of various qualities of geologic formations may be achieved.

Exploration companies desire to reduce computational time associated with processing seismic data in the field and to enhance the understanding of geologic formations based on processed seismic data. Seismic simulation or modeling is an important step in exploration geophysics. For example, seismic simulations may be performed using data which has been obtained by way of one or more historically performed seismic surveys to identify the best layout of geophone arrays and locations of seismic sources for targeted seismic exploration.

BRIEF DESCRIPTION OF THE DRAWINGS

For a detailed description of exemplary embodiments, reference will now be made to the accompanying drawings in which:

FIG. 4 shows a seismic source file in accordance with at least some embodiments;

NOTATION AND NOMENCLATURE

Figure 1:
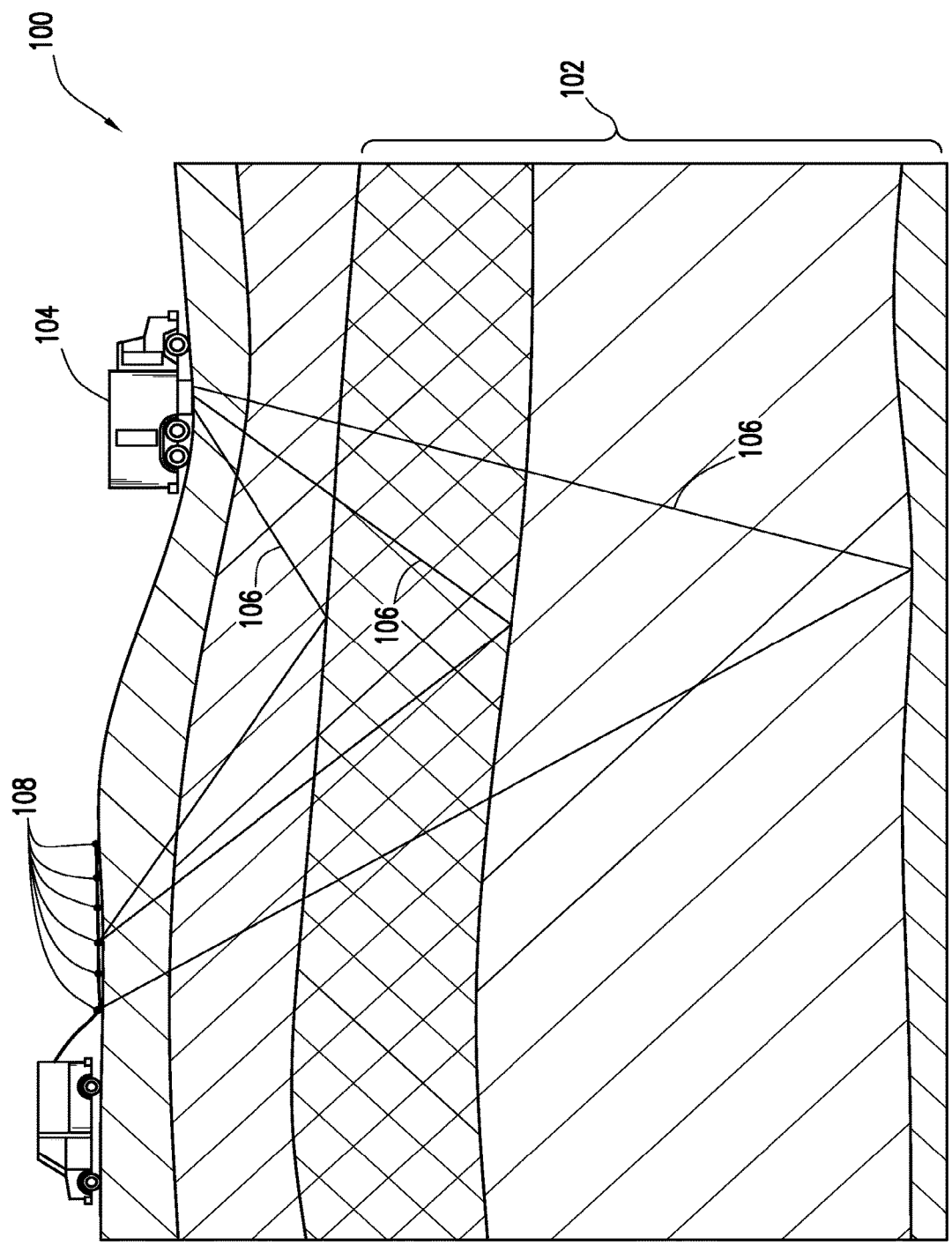
FIG. 1 shows a cross-sectional elevation view of a land-based seismic survey in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Seismic source file" shall mean data describing the characteristics of at least two seismic sources, the data residing within a computer file.

"Simulation source file" shall mean data describing the characteristics of a geologic formation, the data residing within a computer file.

"Seismic trace output" shall mean a response of simulated seismic waves across layers of a geologic formation from a seismic source through a geologic formation to a receiver or a receiver array.

"Seismic propagation output" shall mean data comprising the combination of the vertical component, horizontal component, and transverse component of seismic energy created by a seismic source, in combination with a pressure component.

"Pressure source" shall mean a seismic source that generates a stress component and a produces a pressure wave (i.e., a P-wave).

"Vertical source" shall mean a seismic source that generates a vertical component (i.e., a z-coordinate component) of particle velocity.

"Radial source" shall mean a seismic source that generates radial components (i.e., x- and y-coordinate components).

"Vector source" shall mean a seismic source that generates particle velocity components in the x-, y-, and z-coordinate planes.

"Moment tensor source" shall mean a seismic source which represents the response of a fault during an earthquake, wherein the mathematical representation of a moment tensor source is comprised of nine sets of two directional vectors.

"Double couple source" shall mean a seismic source used to represent an earthquake source. For purposes of seismic simulation, a double couple source shall be a shear dislocation source described by four fault parameters: the source magnitude; a strike angle; a dip angle; and a rake angle.

DETAILED DESCRIPTION

The following discussion is directed to various embodiments of the invention. Although one or more of these embodiments may be preferred, the embodiments disclosed should not be interpreted, or otherwise used, as limiting the scope of the disclosure and claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example methods and systems are directed to simulating the effect of multiple seismic sources concurrently generating seismic energy which propagates to and reflects from a geologic formation having a plurality of inherent characteristics. In particular, a seismic modeling engine performing the simulation provides an output of the effect of multiple seismic source types on the geologic formation in order to provide a better understanding of how to interpret real-world seismic signals received. The specification first turns to a high level overview of seismic surveying.

Seismic surveying provides data that, when used in conjunction with other available geophysical, borehole, and geological data, can provide information about the structure and distribution of rock types and contents. Seismic surveying may be performed on land or in water.

FIG. 1 shows a side elevation view of a land-based seismic survey system 100 in accordance with at least some embodiments. In particular, a land-based seismic survey may be conducted to provide seismic mapping of the hydrocarbon bearing formation 102. In order to conduct a land-based seismic survey, a seismic source device 104, such as the explosion of dynamite or, as shown in FIG. 1, a "thumper" truck, generates seismic energy 106. In FIG. 4, seismic energy 106 is illustrated by directional lines of wavefront propagation (the wavefronts not specifically shown).

In a land-based seismic survey, the seismic energy 106 propagates to and encounters layers within the hydrocarbon bearing formation 102. For each layer encountered, a portion of the seismic energy 106 is reflected back towards the earth's face and received by an array of seismic receivers 108, such as geophones, and arrival times and amplitudes are recorded. A similar seismic survey may be performed in the water.

Figure 2:
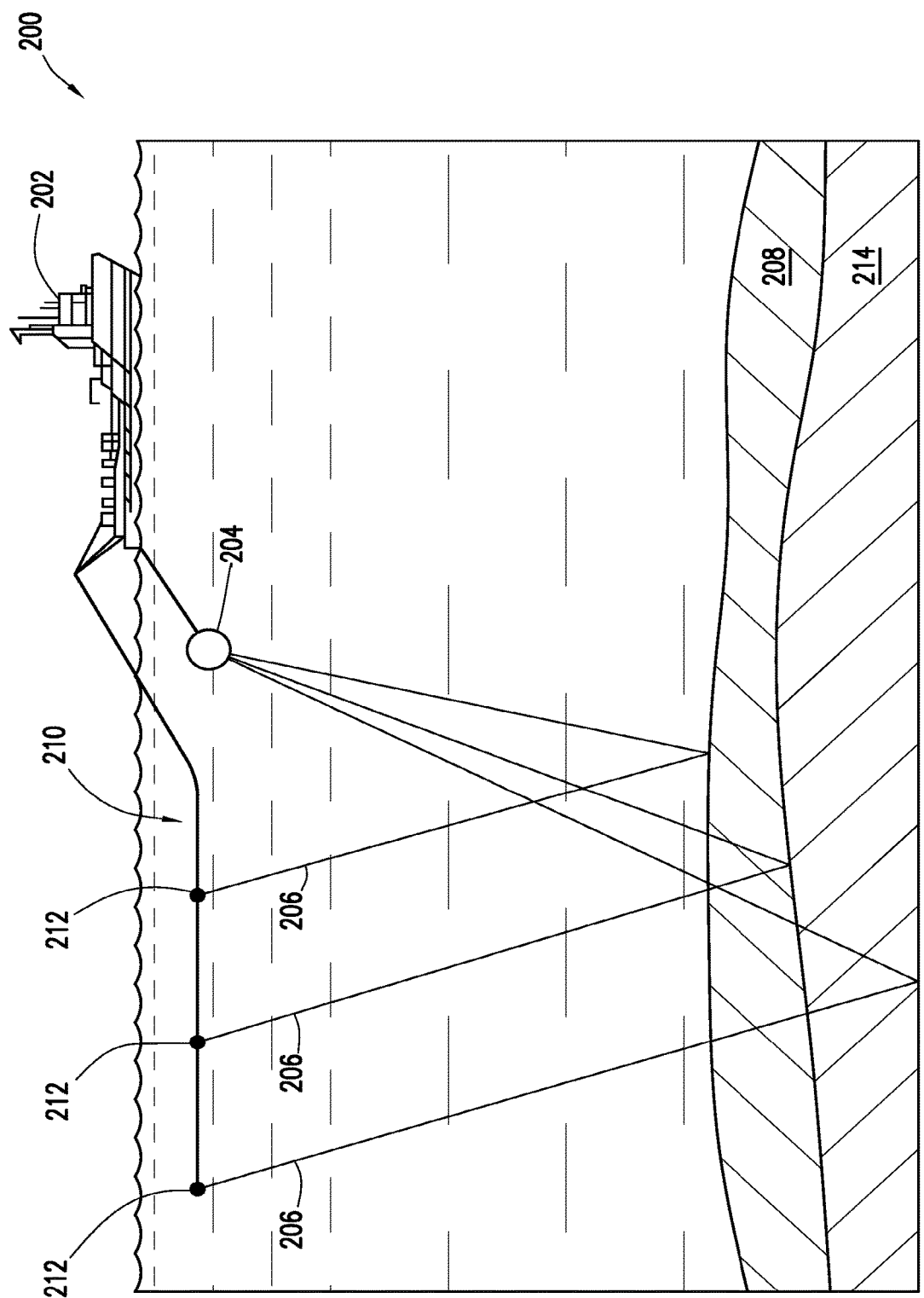
FIG. 2 shows a cross-sectional elevation view of a marine-based seismic survey in accordance with at least some embodiments.

FIG. 2 shows a side elevation view of a marine-based seismic survey system 200 in accordance with at least some embodiments. In particular, FIG. 2 shows a survey vessel 202 towing a seismic source device 204. In one embodiment, the survey vessel 202 also tows a sensor streamer 210, which comprises a number of seismic receivers 212. In the marine-based application, the seismic source device generates seismic energy 206 which travels through the water and into the subsurface layers 208 and 214. As with FIG. 1, the seismic energy 106 is illustrated by directional lines of wavefront propagation (the wavefronts not specifically shown). Portions of the seismic energy 206 are reflected back towards the surface and are detected by seismic receivers 212. In other cases, seismic energy 206 is recorded by seismic receivers resting on the sea-floor (not specifically shown).

For either the land-based survey or the marine based-survey, the data received by the seismic receivers may be sent to a computer system and displayed in the form of seismic traces (i.e., plots of the amplitude of the reflected seismic energy as a function of time for each of the geophones or seismic energy receivers).

In some embodiments, before a land-based or marine-based seismic survey is performed, a geologist may have preliminary data regarding the underground formation (e.g., data from one or more exploratory wellbores, in combination with data from a broad-based seismic survey). More specifically, an initial exploratory survey may be primarily conducted on a large area of earth in order to obtain a low resolution mapping of the geometry of the subsurface formations. From the initial exploratory survey, the geologist may make a determination as to which specific location is likely to contain hydrocarbons, and may subsequently perform a detailed seismic survey on the selected location. In addition, exploratory wellbores may be drilled to provide additional data regarding the underground formation.

As discussed in reference to FIGS. 1 and 2, the seismic survey is performed by way of the propagation of seismic signals generated by a single type of seismic source. In reality, however, multiple types of seismic sources may be generated at the same time. Thus, the geologist may want to simulate the impact of multiple types of seismic sources occurring simultaneously with respect to a geologic formation which may provide additional insight and advantages to the study of geologic structures and reservoir characteristics.

In one embodiment, performing a seismic simulation that more closely models multiple seismic source excitations provides geologists with an opportunity to enhance the processing of seismic signals reduces the costs associated with seismic surveys, and reduces the costs associated with subsequent field exploration. The specification turns now to a more detailed discussion of simulating multiple seismic sources concurrently.

Seismic Simulation System

Figure 3:
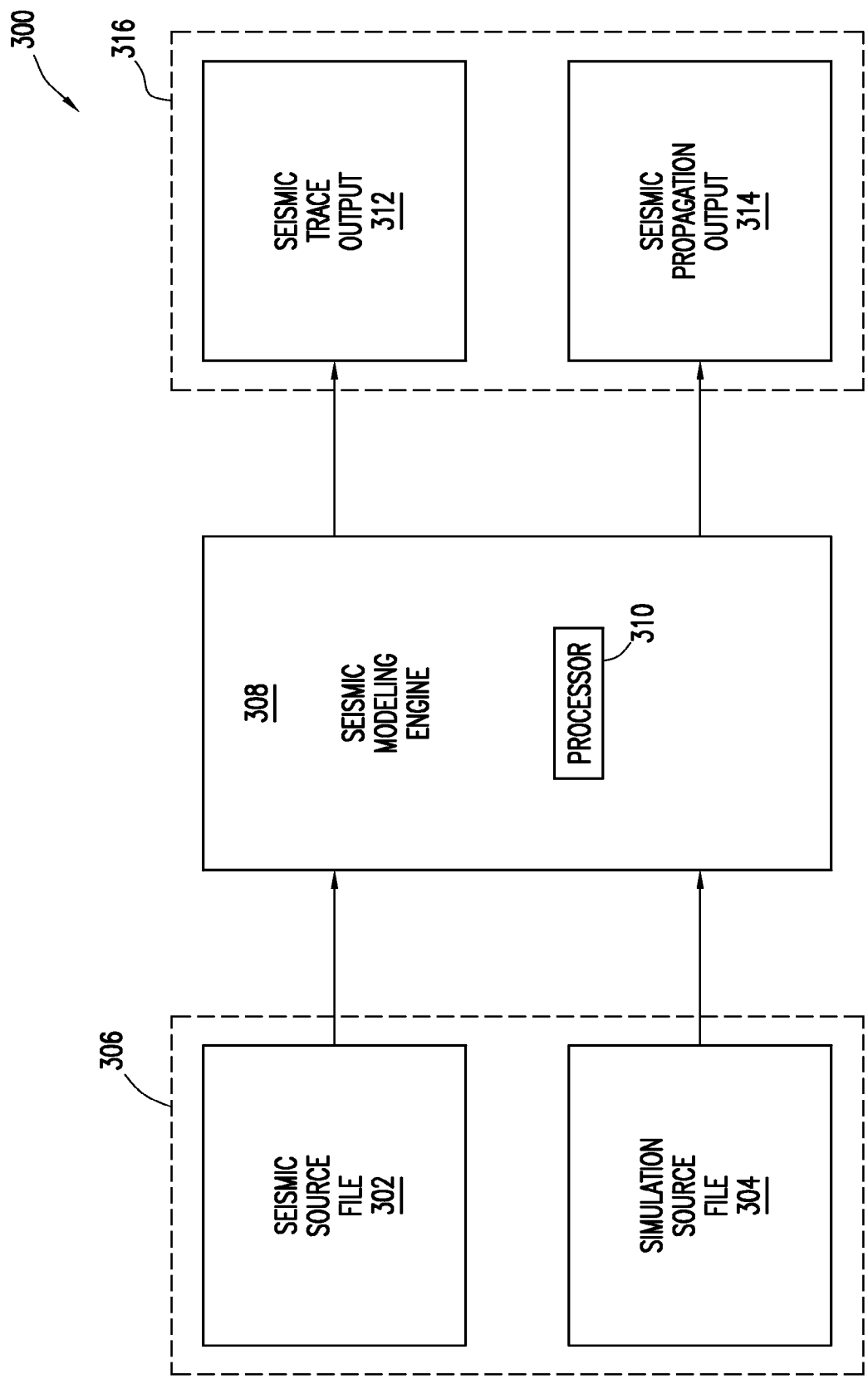
FIG. 3 shows, in block diagram form, a seismic simulation system in accordance with at least some embodiments.

FIG. 3 shows, in block diagram form, a seismic simulation system 300 for simulating the concurrent propagation of acoustic energy from multiple seismic source types to and through the geologic formation in accordance with at least some embodiments. In particular, the seismic simulation system 300 comprises a seismic modeling engine 308, which may be executed by a processor 310, source input file 306, and a source output file 316. Each will be discussed in turn.

The seismic simulation system 300 receives input in the form of a seismic source file 302, and in addition to a seismic source file 302, the seismic modeling engine 308 may also receive a simulation source file 304. In one embodiment, the two source files may be separate and independent files; however, in another embodiment, the seismic source file 302 and the simulation source file 304 may be combined into a single input file 306.

Once the seismic modeling engine 308 receives input data, the seismic modeling engine 308 performs a seismic simulation using the data contained in the input files. In one embodiment, the seismic simulation is performed when the seismic modeling engine 308 applies the input data to an elastic simulation algorithm, although the seismic simulation may be performed by any applicable algorithm. Regardless of the exact type of simulation performed, the seismic modeling engine 308 may generate a seismic trace output file 312 and a seismic propagation output file 314. In one embodiment, the two output files may be separate and independent output files; however, in another embodiment, the seismic trace output file 312 and the seismic propagation output file 314 may be combined into a single output file 316. Either or both of the output files 312 and 314 may be generated based on user preferences. Each input file and output file will be discussed in more detail below.

Seismic Source File

As discussed above, the seismic modeling engine 308 receives at least one seismic source file which enables the simulation of the effect of multiple types of seismic sources concurrently with respect to a geologic formation. Turning now to FIG. 4, FIG. 4 shows an example seismic source file 302 in accordance with at least some embodiments. In one embodiment, the seismic source file may be created by a processor executing a program which receives seismic source data and assembles it into the seismic source file. In another embodiment, the seismic source file may be created by hand by, for example, an engineer or seismologist.

The seismic source file 302 may be represented as data described in an American Standard Code for Information Interchange ("ASCII") format, although any suitable data format may be used, such as a spreadsheet. In the example embodiment shown in FIG. 4, the seismic source file 302 is conceptually represented as a matrix having a number of rows and columns. In another embodiment, the seismic source file is a set of memory locations stored in the memory of a computer system, wherein a computer program accesses each memory location in order to retrieve the requested seismic source file data. For ease of discussion, however, the seismic source file 302 will be described as if the data is stored in the matrix form of FIG. 4.

In FIG. 4, the number of rows corresponds to the number 402 of seismic sources to be simulated. For example, the example number of sources to be simulated is three, and thus the seismic source file may have three rows—one for each seismic source. In another embodiment, the number of sources may also be stored as a data entry in the seismic source file 302.

For each seismic source to be simulated, a plurality of seismic source characteristics are contained within the seismic source file. In one embodiment, the seismic source file may contain data related to, for example: the x- and y-coordinates of the seismic source, the elevation and amplitude of the seismic source, the specific type of seismic source, and any additional information used for the simulation.

In the example seismic source file shown in FIG. 4, the x-coordinate field 404 defines each source's x-coordinate relative to the seismic survey geometry described in the simulation source file 304. In FIG. 4, the first seismic source (e.g., the top row) has an example x-coordinate of 3000.0. The y-coordinate field 406 defines each source's y-coordinate relative to the seismic survey geometry described in the simulation source file 304. In the example seismic source file 302, the first seismic source has an example y-coordinate of 4500.0. The elevation field 408 defines each seismic source's elevation relative to sea level or another vertical reference plane described in the simulation source file 304. In FIG. 4, the first seismic source has an elevation of −1000. The amplitude field 410 indicates an amplitude of the signal produced by each seismic source. In the example seismic source file 302, each of the three seismic sources has an amplitude of 1.

The seismic source type field 411 is a field that describes the type of each source to be simulated. Any number of seismic sources types may be contemplated, but for purposes of discussion, the seismic sources type may be characterized by one of the following six example seismic source types: a pressure source, a vertical source, a radial source, a vector source, a double couple source, and a moment tensor source. In the example embodiment matrix of FIG. 4, each seismic source type may be given an index to be used in the seismic source file 302; for example, a pressure source may correspond to an index of '1'; a vertical source—an index of '2'; a radial source—an index of '3'; a vector source—an index of '4'; a double couple source'—an index of '5'; and a moment tensor source—an index of '6'. In another embodiment, the seismic source types may be a set of data types or special characters delineated in a computer program.

Each example seismic source is designed to achieve a specific seismic simulation outcome. For example, a vector source and a double couple source may be designed for modeling the seismic energy radiated during an earthquake with a single direction of motion on a single fault plane. Furthermore, the vector and double couple sources may be used for monitoring hydraulic fractures.

In some cases, a seismic source type may also be defined by a set of special coefficients. In one embodiment, if a seismic source has additional characteristics defined by special coefficients, the special coefficients may be included in the seismic source file 302 in the special coefficients 412 field. As with the seismic source type, the special coefficients may be user-defined and may be given an index corresponding to characteristics applicable to each seismic source type. In another embodiment, the special coefficients may be a set of data types or special characters delineated in a computer program.

Again considering the matrix example of FIG. 4, seismic source file 302 shows the first seismic source as Type 6 which may correspond to a moment tensor source having special coefficients. In this example, the special coefficients may be indicative of data related to a moment tensor source matrix data, wherein the mathematical representation of a moment tensor source is comprised of nine numbers representing the movement associated with a fault during an earthquake.

In contrast, the third seismic source in the seismic source file 302 is a vertical source (i.e., Type 2), and does not have any related special coefficients.

Although the example seismic source file 302 shows three seismic sources to be simulated, two of which are the same seismic source types (i.e., moment tensor sources), the seismic source file 302 may be comprised of any quantity and any combination of seismic sources and seismic source types.

In another embodiment, the seismic source file 302 may comprise a plurality of input source wavelets used to define a variety of excitation types and various injection properties, and combined with various seismic source types to simulate different seismic wave propagation scenarios. For example, a Ricker wavelet may be combined with a vertical source type to simulate surface seismic energy or a Ricker wavelet may be combined with a moment tensor source type to simulate microseismic energy. Other example input wavelets may include a Klauder wavelet, or any other user-defined wavelet type.

Simulation Source File

Returning again to FIG. 3, the seismic modeling engine 308 may also receive data by way of a simulation source file 304. The simulation source file 304 may be represented in ASCII format, although any suitable data format, such as those described previously, may be used. In one embodiment, the simulation source file 304 describes the characteristics of the geologic formation on which the seismic simulation will be performed. For example, the simulation source file 604 may describe the density, size, acoustic velocity, petrological facies, and depositional facies associated with the geologic formation.

Seismic Trace Output

In one embodiment, the seismic trace output 312 may be a collection of simulated seismic samples represented by three-dimensional array with each sample in the array representing the amplitude of the simulated seismic signal as a function of time (t) and position on the earth (e.g., using x- and y-coordinates). As with the seismic source file 302 and simulation source file 304, the seismic trace output 312 may be represented in ASCII format, although any suitable data format may be used.

Seismic Propagation Output

In one embodiment, the seismic propagation output may comprise a plurality of seismic trace outputs which have been collected into a plurality of common shot gathers. Each common shot gather may be indicative of a plurality of seismic traces originating from a single seismic source and receives at multiple receivers. In particular, the seismic propagation output may be the seismologic acquisition information stored within three receiver components: a vertical component, a horizontal component, and a transverse component, in combination with a pressure component. In addition, each component comprises each seismic source's location (i.e., x- and y-coordinate, depth, and elevation), as well as each receiver's location (i.e., x- and y-coordinates, depth, and elevation).

Figure 5:
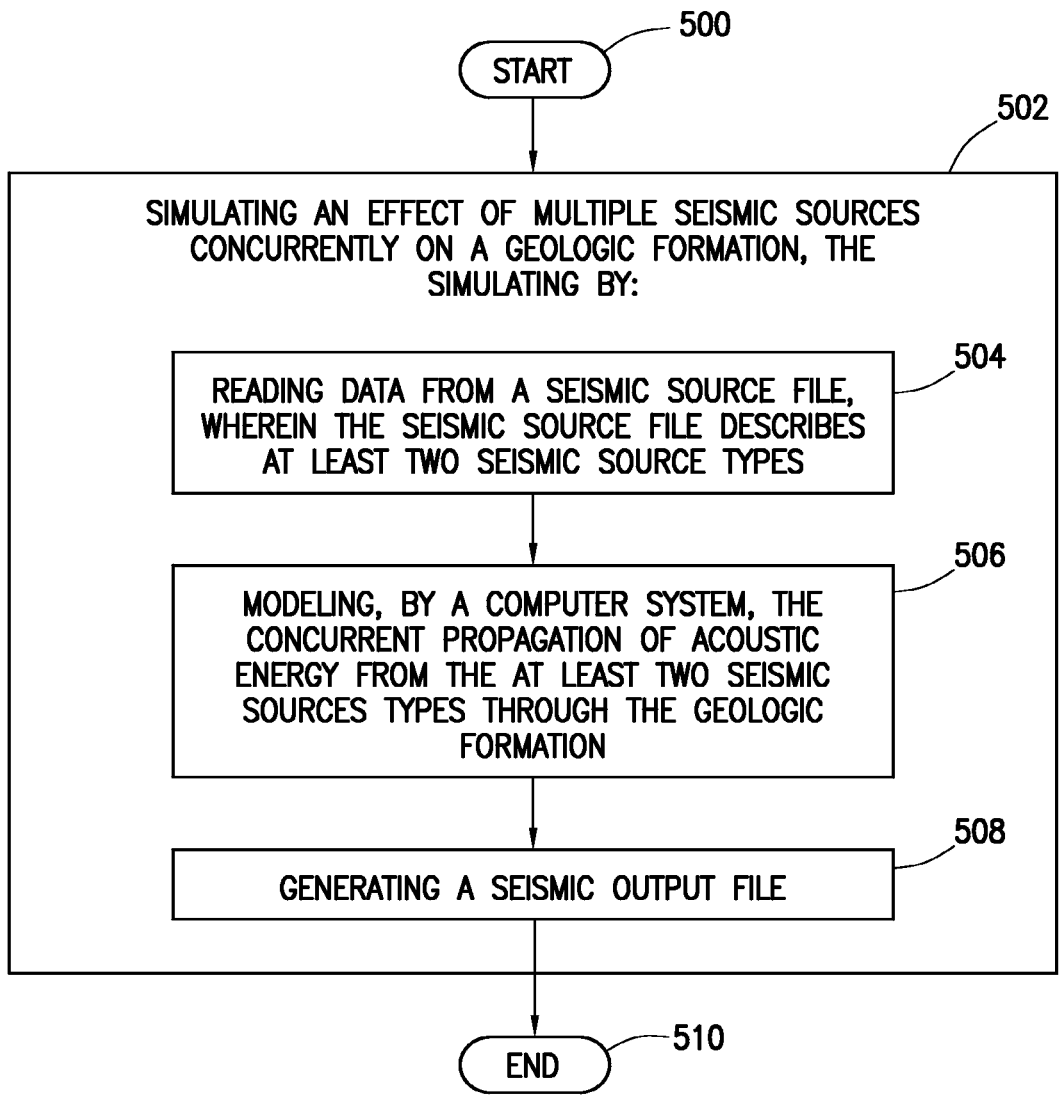
FIG. 5 shows, in block diagram form, a method in accordance with at least some embodiments.

FIG. 5 shows a method in accordance with at least some example embodiments. In particular, the method starts (block 500) simulating an effect of multiple seismic sources concurrently on a geologic formation (block 502), the simulating by: reading data from a seismic source file, wherein the seismic source file describes at least two seismic source types (block 504); modeling, by a computer system, the concurrent propagation of acoustic energy from the at least two seismic sources types through the geologic formation (block 506); and generating a seismic output file (block 508). Thereafter, the method ends (block 510).

Figure 6:
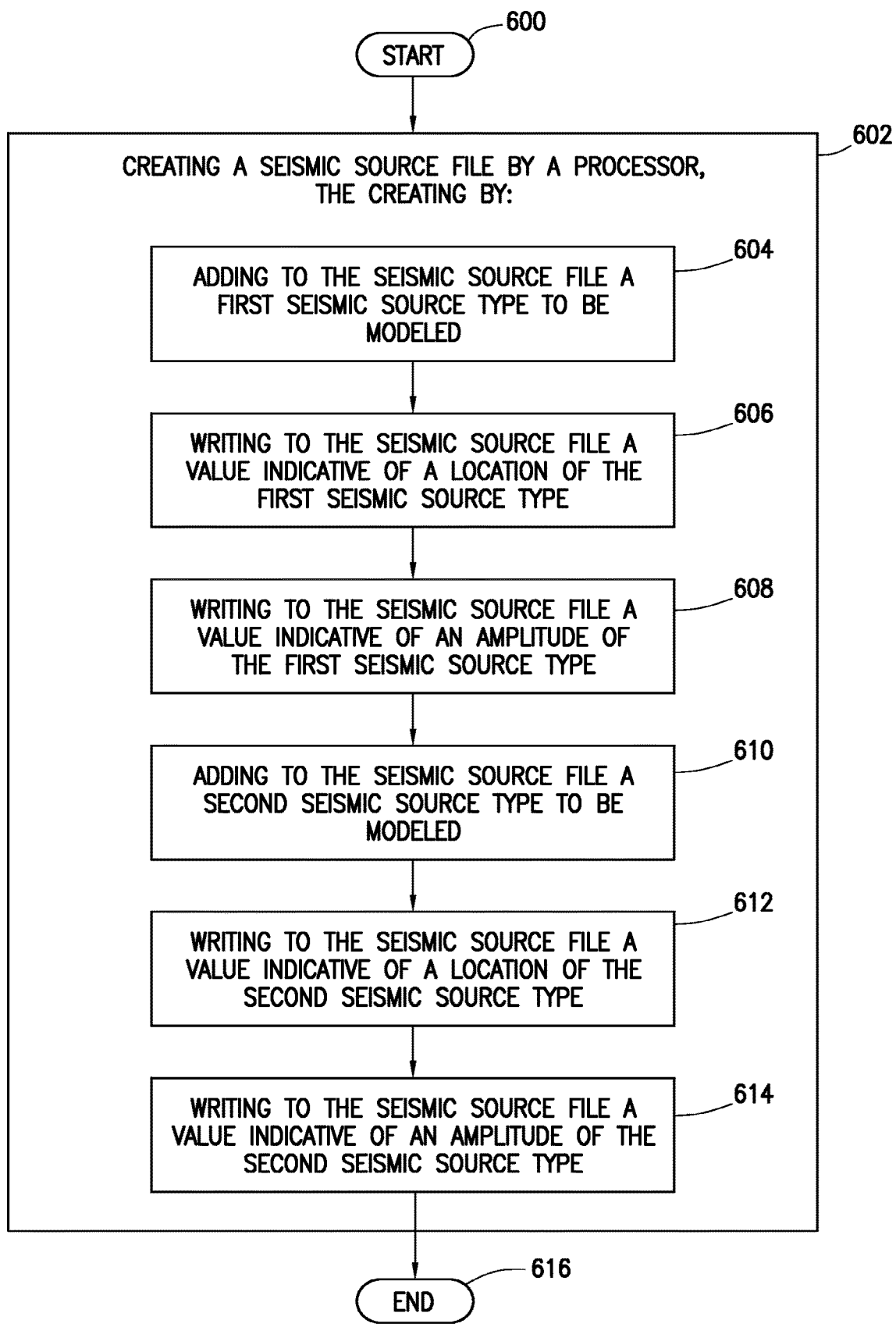
FIG. 6 shows, in block diagram form, a method in accordance with at least some embodiments.

FIG. 6 shows a method in accordance with at least some example embodiments. In particular, the method starts (block 600) by creating a seismic source file by a processor (block 602), the creating by: adding to the seismic source file a first seismic source type to be modeled (block 604); writing to the seismic source file a value indicative of a location of the first seismic source type (block 606); writing to the seismic source file a value indicative of an amplitude of the first seismic source type (block 608); adding to the seismic source file a second seismic source type to be modeled (block 610); writing to the seismic source file a value indicative of a location of the second seismic source type (block 612); and writing to the seismic source file a value indicative of an amplitude of the second seismic source type (block 614). Thereafter, the method ends (block 616).

Figure 7:
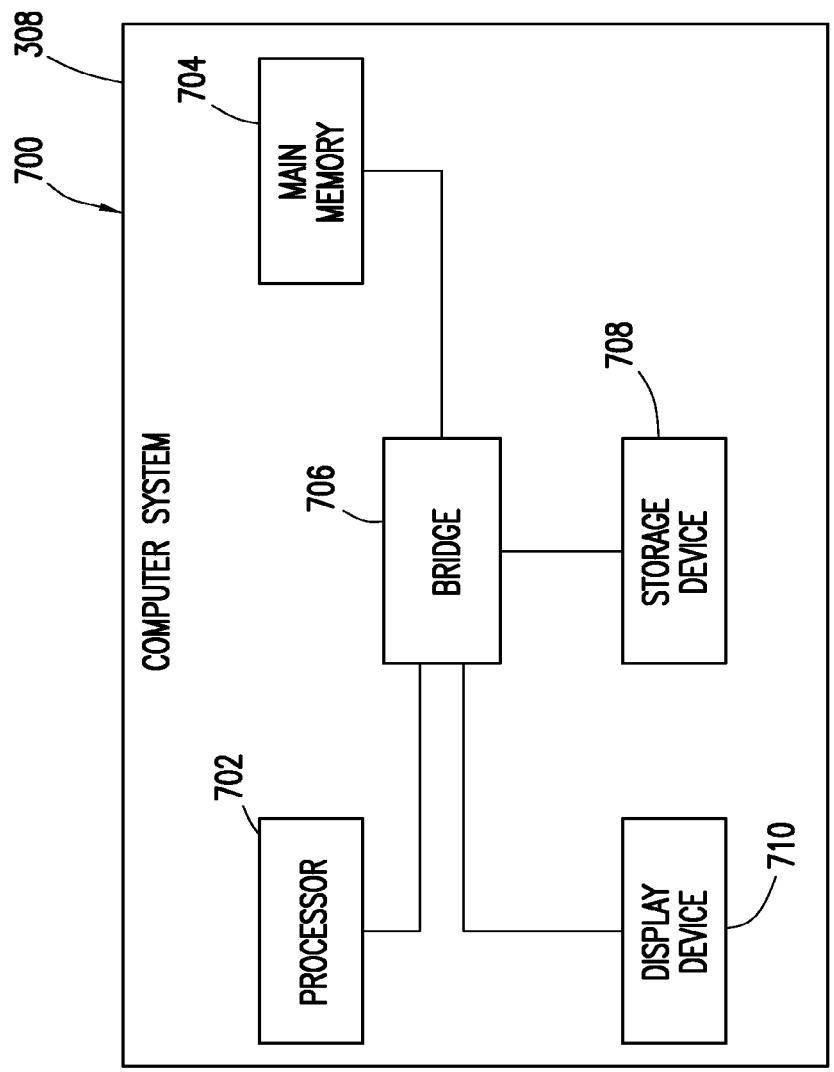
FIG. 7 shows, in block diagram form, a computer system in accordance with at least some embodiments

FIG. 7 shows a computer system 700, which is illustrative of a computer system upon which the various embodiments may be practiced, such as the seismic modeling engine 308. In particular, computer system 700 comprises a processor 702, and the processor couples to a main memory 704 by way of a bridge device 706. Moreover, the processor 702 may couple to a long term storage device 708 (e.g., a hard drive, solid state disk, memory stick, optical disc) by way of the bridge device 706. Programs executable by the processor 702 may be stored on the storage device 708, and accessed when needed by the processor 702. The program stored on the storage device 708 may comprise programs to implement the various embodiments of the present specification. In some cases, the programs are copied from the storage device 708 to the main memory 704, and the programs are executed from the main memory 704. Thus, the main memory 704, and storage device 708 shall be considered computer-readable storage mediums. In addition, a display device 712, which may comprise any suitable electronic display device upon which any image or text can be displayed, may be coupled to the processor 702 by way of bridge 706. Furthermore, computer system 700 may comprise a network interface 710, coupled to the processor 702 by way of bridge 706, and coupled to storage device 704, the network interface acting to couple the computer system to a communication network.

From the description provided herein, those skilled in the art are readily able to combine the methods described above in the form of software with appropriate general purpose or special purpose computer hardware to create a computer system and/or computer subcomponents embodying the invention, to create a computer system and/or computer subcomponents for carrying out the method of the invention, and/or to create a non-transitory computer-readable media (i.e., not a carrier wave) for storing a software program to implement the method aspects of the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

At least some embodiments are methods comprising: simulating an effect of multiple seismic sources concurrently on a geologic formation, the simulating by: reading data from a seismic source file, wherein the seismic source file describes at least two seismic source types; modeling, by a computer system, the concurrent propagation of acoustic energy from the at least two seismic sources types through the geologic formation; and generating a seismic output file.

Other embodiments may also comprise reading data regarding at least two seismic source types selected from the group consisting of: a pressure source; a vertical source; a radial source; a vector source; a double couple source; and a moment tensor source.

Other embodiments may also comprise applying the data from the seismic source file to an elastic simulator algorithm.

Other embodiments may also comprise generating at least one selected from the group consisting of: a seismic trace output; and a seismic propagation output.

Other embodiments may also comprise reading data from a simulation source file; wherein modeling the seismic effect of the at least two seismic source types further comprises generating based on both the seismic source file and the simulation source file.

Other embodiments may also comprise wherein reading the seismic source file and reading the simulation source file further comprising reading a single input file.

Other embodiments may also comprise reading at least one value indicative of the geologic formation selected from the group consisting of: a density; a size; an acoustic velocity; and a geometry.

Other embodiments may be methods comprising creating a seismic source file by a processor, the creating by: adding to the seismic source file a first seismic source type to be modeled; writing to the seismic source file a value indicative of a location of the first seismic source type; writing to the seismic source file a value indicative of an amplitude of the first seismic source type; adding to the seismic source file a second seismic source type to be modeled; writing to the seismic source file a value indicative of a location of the second seismic source type; and writing to the seismic source file a value indicative of an amplitude of the second seismic source type.

Other embodiments may also comprise writing a value indicative of an x-coordinate and a y-coordinate.

Other embodiments may also comprise writing to the seismic source file a value indicative of elevation of the first seismic source and a value indicative of elevation of the second seismic source type.

Other embodiments may also comprise, for each seismic source type, writing to the seismic source file values representing a movement on a fault during an earthquake.

Other embodiments may be computer systems comprising a processor; a memory coupled to the processor; the memory storing a program that, when executed by the processor, causes the processor to: read data from a seismic source file, wherein the seismic source file describes at least two seismic source types; model a concurrent propagation of acoustic energy from the at least two seismic sources types through a geologic formation; and then generate a seismic output file.

The program may also cause the processor to read data from the seismic source file regarding at least two seismic source types selected from the group consisting of: a pressure source; a vertical source; a radial source; a vector source; a double couple source; and a moment tensor source.

The program may also cause the processor to apply the data from the seismic source file to an elastic simulator algorithm.

The program may also cause the processor to generate at least one selected from the group consisting of: a seismic trace output; and a seismic propagation output.

The program may also cause the processor to read data from a simulation source file; and wherein when the processor causes the program to model the concurrent propagation of acoustic energy from of the at least two seismic source types, the program further causes the processor to generate based on both the seismic source file and the simulation source file.

The program may also cause the processor to read a single input file.

The program may also cause the processor to read at least one value indicative of the geologic formation selected from the group consisting of: a density; a size; an acoustic velocity; and a geometry.

Other embodiments are computer-readable mediums storing instructions that, when executed by a processor, cause the processor to: read data from a seismic source file, wherein the seismic source file describes at least two seismic source types; model a concurrent propagation of acoustic energy from the at least two seismic source types through a geologic formation; and then generate a seismic output file.

The program may also cause the processor to read data from the seismic source file regarding at least two seismic source types selected from the group consisting of: a pressure source; a vertical source; a radial source; a vector source; a double couple source; and a moment tensor source.

The program may also cause the processor to apply the data from the seismic source file to an elastic simulator algorithm.

The program may also cause the processor to generate at least one selected from the group consisting of: a seismic trace output; and a seismic propagation output.

The program may also cause the processor to read data from a simulation source file; and wherein when the processor causes the program to model the concurrent propagation of acoustic energy from of the at least two seismic source types, the program further causes the processor to generate based on both the seismic source file and the simulation source file.

The program may also cause the processor to read a single input file.

The program may also cause the processor to read at least one value indicative of the geologic formation selected from the group consisting of: a density; a size; an acoustic velocity; and a geometry.

What is claimed is:

1. A method for targeted seismic exploration of a geologic formation, the method comprising:
reading, by a computer system, data from at least one source file for a seismic simulation to be performed, wherein the at least one source file describes characteristics of the geologic formation based on an initial exploratory survey, a plurality of input source wavelets that define a variety of excitation types and injection properties for different seismic source types, and characteristics of at least two seismic source types, the plurality of input source wavelets including a Ricker wavelet, and the characteristics of each seismic source type including an amplitude and a relative location of that seismic source type with respect to the geologic formation;
simulating, by the computer system, different seismic wave propagation scenarios with a concurrent propagation of seismic signals from the at least two seismic source types through the geologic formation to a plurality of seismic receivers, wherein each of the seismic wave propagation scenarios is based on a different combination of the plurality of input source wavelets and the at least two seismic source types;
generating a seismic output file including a three-dimensional array representing a response of the simulated seismic signals from the at least two seismic source types as a function of time and location with respect to the geologic formation;
selecting a location for a detailed seismic survey of the geologic formation to be performed, based on the response of the simulated seismic signals on the geologic formation as represented by the three-dimensional array in the generated seismic output file; and
performing the detailed seismic survey at the selected location.

2. The method of claim 1 wherein the at least two seismic source types are selected from the group consisting of: a pressure source; a vertical source; a radial source; a vector source; a double couple source; and a moment tensor source.

3. The method of claim 1 wherein simulating further comprises applying the data from the at least one source file to an elastic simulator algorithm.

4. The method of claim 1 wherein generating the seismic output file further comprises generating at least one selected from the group consisting of: a seismic trace output; and a seismic propagation output.

5. The method of claim 1 wherein the at least one source file includes a seismic source file and a separate simulation source file, the seismic source file describes the characteristics of each seismic source type, the simulation source file describes the characteristics of the geologic formation, and the simulation is performed based on the data read from both the seismic source file and the simulation source file.

6. The method of claim 5 wherein reading the simulation source file further comprises reading at least one value indicative of the geologic formation selected from the group consisting of: a density; a size; an acoustic velocity; and a geometry.

7. The method of claim 5, further comprising:
creating the seismic source file by a processor of the computer system, the creating by:
adding to the seismic source file a first seismic source type to be simulated;
writing to the seismic source file a value indicative of a location of the first seismic source type;
writing to the seismic source file a value indicative of an amplitude of the first seismic source type;
adding to the seismic source file a second seismic source type to be simulated;
writing to the seismic source file a value indicative of a location of the second seismic source type; and
writing to the seismic source file a value indicative of an amplitude of the second seismic source type.

8. The method of claim 7 wherein writing the location further comprises writing a value indicative of an x-coordinate and a y-coordinate.

9. The method of claim 7 further comprising writing to the seismic source file a value indicative of elevation of the first seismic source type and a value indicative of elevation of the second seismic source type.

10. The method of claim 7 further comprising, for each seismic source type, writing to the seismic source file values representing a movement on a fault during an earthquake.

11. A system comprising:
a processor;
a memory coupled to the processor;
the memory storing a program that, when executed by the processor, causes the processor to:
read data from at least one source file for a seismic simulation to be performed, wherein the at least one source file describes characteristics of the geologic formation based on an initial exploratory survey, a plurality of input source wavelets that define a variety of excitation types and injection properties for different seismic source types, and characteristics of at least two seismic source types, the plurality of input source wavelets including a Ricker wavelet, and the characteristics of each seismic source type including an amplitude and a relative location of that seismic source type with respect to the geologic formation;
simulate different seismic wave propagation scenarios with a concurrent propagation of seismic signals from the at least two seismic sources types through a geologic formation to a plurality of seismic receivers, wherein each of the seismic wave propagation scenarios is based on a different combination of the plurality of input source wavelets and the at least two seismic source types;
generate a seismic output file including a three-dimensional array representing a response of the simulated seismic signals from the at least two seismic source types as a function of time and location with respect to the geologic formation; and
select a location for a detailed seismic survey of the geologic formation to be performed, based on the response of the simulated seismic signals on the geologic formation as represented by the three-dimensional array in the generated seismic output file,
wherein the detailed seismic survey is performed at the selected location.

12. The system of claim 11 wherein the at least two seismic source types are selected from the group consisting of: a pressure source; a vertical source; a radial source; a vector source; a double couple source; and a moment tensor source.

13. The system of claim 11 wherein the program further causes the processor to apply the data from the at least one source file to an elastic simulator algorithm.

14. The system of claim 11 wherein when the processor generates the seismic output file, the program further causes the processor to generate at least one selected from the group consisting of: a seismic trace output; and a seismic propagation output.

15. The system of claim 11:
wherein the at least one source file includes a seismic source file and a simulation source file;
wherein the seismic source file describes the characteristics of each seismic source type and the simulation source file describes the characteristics of the geologic formation; and
wherein the simulation is performed based on the data read from both the seismic source file and the simulation source file.

16. The system of claim 15 wherein when the processor causes the program to read the seismic source file and read the simulation source file, the program further causes the processor to read a single input file.

17. The system of claim 15 wherein when the processor reads the simulation source file, the program further causes the processor to read at least one value indicative of the geologic formation selected from the group consisting of: a density; a size; an acoustic velocity; and a geometry.

18. A non-transitory computer readable medium storing a program that, when executed by a processor, cause the processor to:
read data from at least one source file for a seismic simulation to be performed, wherein the at least one source file describes characteristics of the geologic formation based on an initial exploratory survey, a plurality of input source wavelets that define a variety of excitation types and injection properties for different seismic source types, and characteristics of at least two seismic source types, the plurality of input source wavelets including a Ricker wavelet, and the characteristics of each seismic source type including an amplitude and a relative location of that seismic source type with respect to the geologic formation;
simulate different seismic wave propagation scenarios with a concurrent propagation of seismic signals from the at least two seismic source types through a geologic formation to a plurality of seismic receivers, wherein each of the seismic wave propagation scenarios is based on a different combination of the plurality of input source wavelets and the at least two seismic source types;
generate a seismic output file including a three-dimensional array representing a response of the simulated seismic signals from the at least two seismic source types as a function of time and location with respect to the geologic formation; and
select a location for a detailed seismic survey of the geologic formation to be performed, based on the response of the simulated seismic signals on the geologic formation as represented by the three-dimensional array in the generated seismic output file,
wherein the detailed seismic survey is performed at the selected location.

19. The non-transitory computer-readable medium of claim 18 wherein the at least two seismic source types are selected from the group consisting of: a pressure source; a vertical source; a radial source; a vector source; a double couple source; and a moment tensor source.

20. The non-transitory computer-readable medium of claim 18 wherein the program further causes the processor to apply the data from the at least one source file to an elastic simulator algorithm.

21. The non-transitory computer-readable medium of claim 18 wherein when the processor generates the seismic output file, the program further causes the processor to generate at least one selected from the group consisting of: a seismic trace output; and a seismic propagation output.

22. The non-transitory computer-readable medium of claim 18:
wherein the at least one source file includes a seismic source file and a simulation source file;
wherein the seismic source file describes the characteristics of each seismic source type and the simulation source file describes the characteristics of the geologic formation; and wherein the simulation is performed based on the data read from both the seismic source file and the simulation source file.

23. The non-transitory computer-readable medium of claim 22 wherein when the program causes the processor to read the seismic source file and read the simulation source file, the program further causes the processor to read a single input file.

24. The non-transitory computer-readable medium of claim 22 wherein when the processor reads the stimulation source file, the program further causes the processor to read at least one value indicative of the geologic formation selected from the group consisting of: a density; a size; an acoustic velocity and a geometry.

* * * * *